Nov. 16, 1943.    J. J. JAKOSKY    2,334,491
METHOD AND APPARATUS FOR DETERMINING THE ELECTRICAL
CHARACTERISTICS OF GEOLOGICAL FORMATIONS
TRAVERSED BY A DRILL HOLE
Original Filed Dec. 21, 1935    3 Sheets-Sheet 2

BY John Jakosky
INVENTOR

Nov. 16, 1943. J. J. JAKOSKY 2,334,491
METHOD AND APPARATUS FOR DETERMINING THE ELECTRICAL
CHARACTERISTICS OF GEOLOGICAL FORMATIONS
TRAVERSED BY A DRILL HOLE
Original Filed Dec. 21, 1935 3 Sheets-Sheet 3
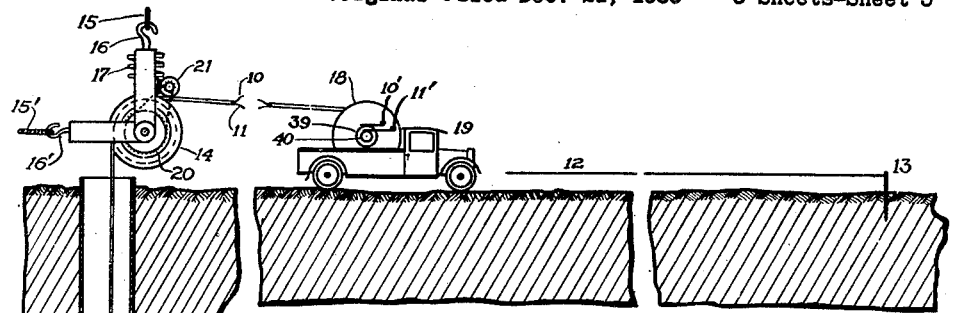
FIG. 6.
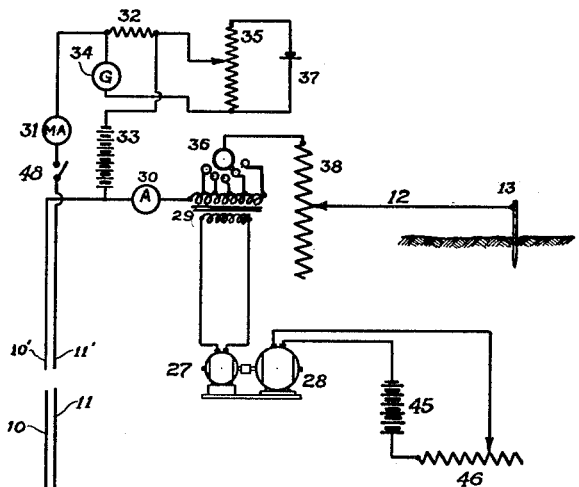
FIG. 7.
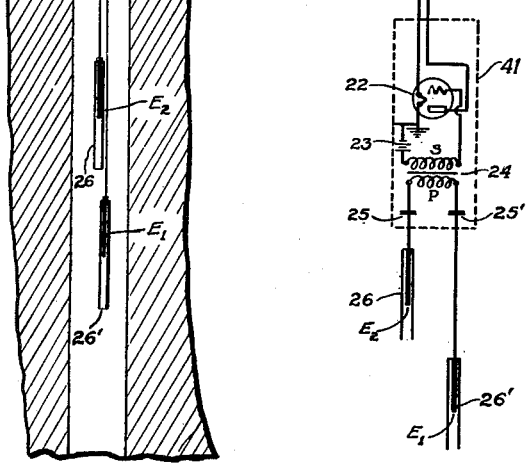
BY John J. Jakosky
INVENTOR Patented Nov. 16, 1943

2,334,491

UNITED STATES PATENT OFFICE 2,334,491

METHOD AND APPARATUS FOR DETERMINING THE ELECTRICAL CHARACTERISTICS OF GEOLOGICAL FORMATIONS TRAVERSED BY DRILL HOLES

John Jay Jakosky, Los Angeles, Calif., assignor to Schlumberger Well Surveying Corporation, Houston, Tex., a corporation of Delaware Application December 21, 1935, Serial No. 55,600
Renewed July 27, 1939

25 Claims. (Cl. 175—182)

This invention pertains to an apparatus and a method of determining the character, thickness, and the strike and dip of the geological strata traversed by a drill hole. The invention may be employed in newly-drilled holes.

In the conventional method of determining the electrical characteristics of strata traversed by a drill hole, it is customary to pass the current at right-angles to the bedding planes of the strata. The energizing current flows chiefly along the bore hole itself, and may be applied in one of two methods: (a) by connecting one terminal of the current supply at the surface of the ground near the well and lowering the other current terminal in the well; or (b) by lowering both terminals or electrodes within the well. In either case, the chief path of current flow is along the drill hole itself. Since the drill hole is usually vertical, and in petroleum fields the stratification is substantially horizontal, it follows that the current flow is substantially perpendicular to the strata or bedding planes.

Another method has been proposed utilizing two electrodes, one fixed within a bore-hole and the other placed at various positions along the surface of the earth. Inasmuch as the electrode within the drill hole remains fixed in position, the measurements do not supply information regarding the individual strata traversed by the drill hole; since in any of these methods a change in the subsurface can only manifest itself as an anomaly, when one or both electrodes are moved from one position to another. When the two electrodes are a considerable distance apart, and one electrode remains fixed in position, the current flow in its vicinity is substantially through the same region regardless of the position of the other electrode. Any anomalies, such as would be associated with changes in the path of the current flow, will be caused chiefly by redistribution of the current in the vicinity of the moving electrode. A fixed electrode within the drill hole and a movable electrode at the surface is therefore impractical for obtaining information regarding the thickness and other properties of the strata immediately adjacent the drill hole itself.

The present invention embodies a method for obtaining detailed information regarding the strata of the geological formation, in the close proximity of the bore hole. The chief object of this invention is to provide a method and apparatus in which the current is passed through the ground so that the direction of flow is along the bedding planes, whereupon the electrical characteristics of the strata will have a maximum effect upon the distribution of the current and/or potential, and in which measurements are made to determine the effect of such electrical properties upon the current and/or potential distribution in the strata adjacent the bore-hole, with the current flowing through strata of different depths. According to this invention, the differences in electrical properties of the strata adjacent the bore-hole, at different depths, are determined by measuring corresponding changes in the relative values of the current passed through the ground and the accompanying electrical potential between a point within the drill hole adjacent the strata through which the current passes, and another point within the path of the current.

Another object of the invention is to provide a method which will be far more sensitive than the conventional type resistivity method now employed.

Another object of the invention is to provide a method for determining the general strike and dip of the strata penetrated by the drill-hole. This is of particular importance in wells drilled in new areas where the subsurface geology has not been completely solved; and it is also important for proper correlation of cores recovered during the drilling operations.

A further object of this invention is to provide an improved apparatus of great sensitivity and reliable operating characteristics, for making either direct or alternating current measurements in bore-holes.

The accompanying drawings illustrate the method and apparatus used in accordance with this invention, and the advantages thereof over methods previously used, and referring thereto:

Figure 5 illustrates an improved form of electrode suitable for use in accordance with this invention.

Figure 6 illustrates the preferred apparatus used for my work.

Figure 7 is a wiring diagram of the component parts of my preferred apparatus.

Figure 1:
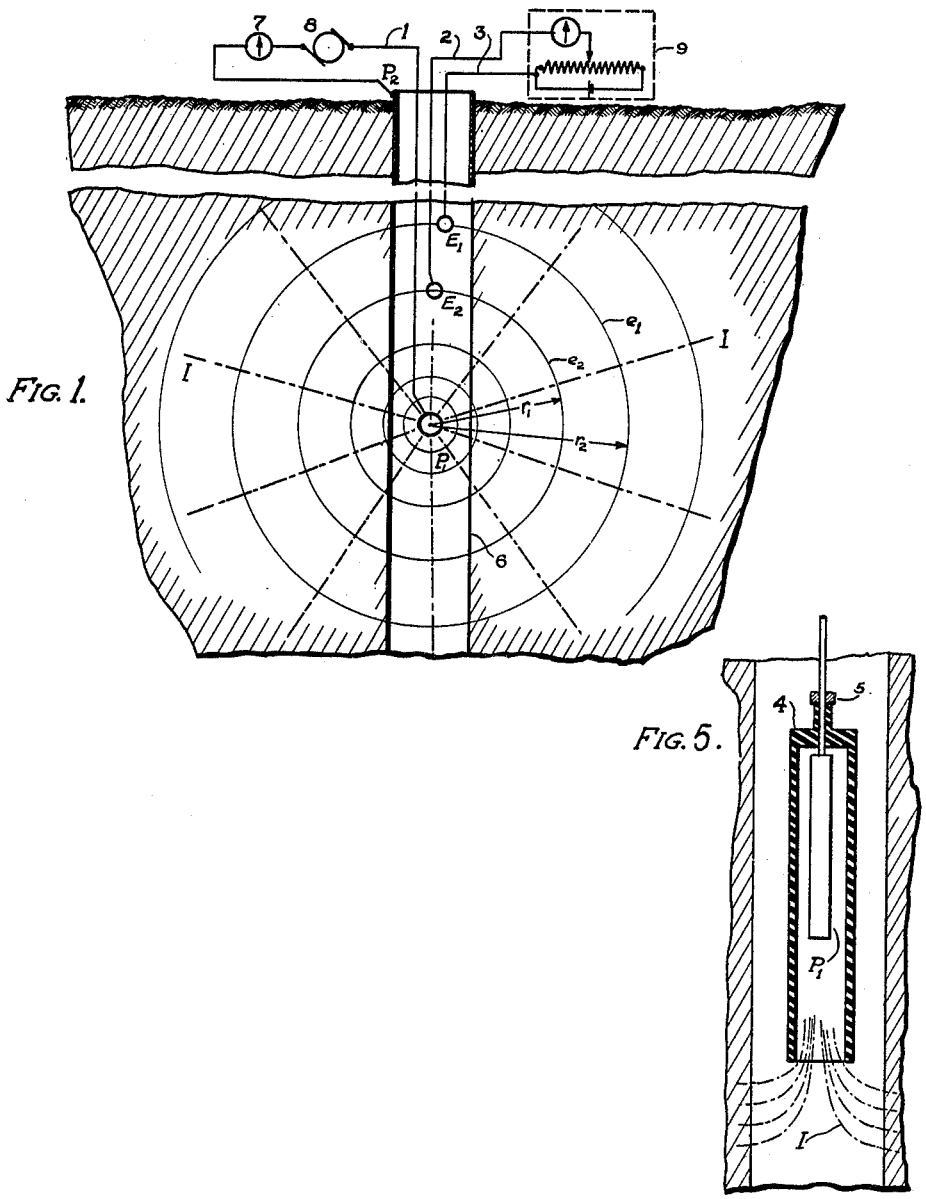
Figure 1 is a diagrammatic representation of the supposed current flow and potential distribution in a conventional type of method employed in surveying bore holes.
Figure 2:
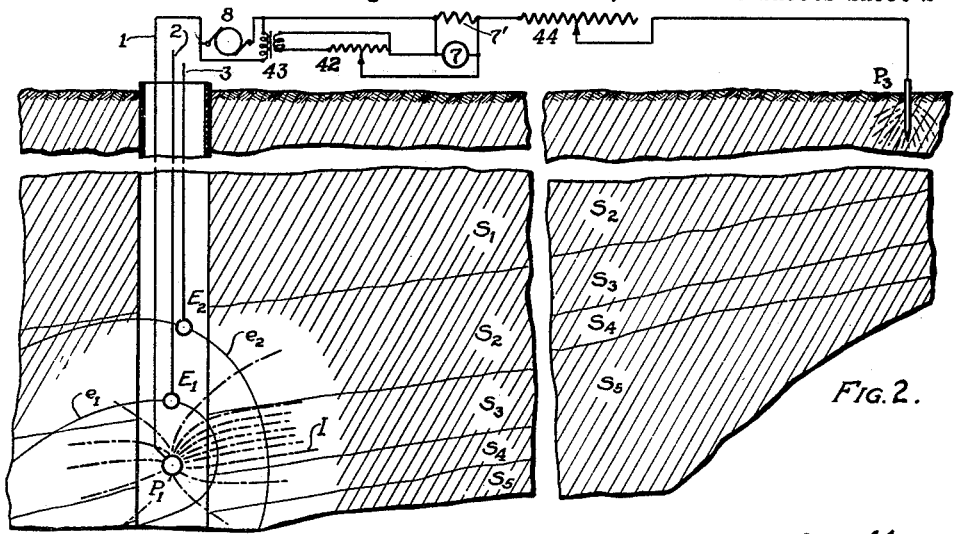
Figure 2 illustrates the flow of current and the potential distribution when one electrode is lowered into the drill hole, and the other electrode is grounded at a considerable distance from the mouth of the drill hole, in accordance with this invention.

In the conventional type of drill hole electrical logging apparatus, as illustrated in Figure 1, direct or low-frequency alternating current is supplied by a generator 8. This power-source is connected in series with an ammeter 7, and one terminal of the circuit is grounded at the surface, usually the surface casing of the well, as at $P_2$. The other energizing terminal $P_1$ is lowered into the well 6. The lowered terminal is connected, by means of an insulated cable 1, with the power supply at the surface of the ground. Two spaced auxiliary electrodes, $E_1$ and $E_2$, are placed at known distances from $P_1$, and connected by means of insulated conductors 2 and 3, with a conventional potentiometer and galvanometer 9. It has heretofore been assumed that the two equipotential surfaces, $e_1$ and $e_2$, passing through points $E_1$ and $E_2$, are substantially spherical and undistorted. These spheres supposedly cut the column of water within the drill hole without appreciable deformation, allegedly because of the extremely small area of cross section of the drill hole compared to the distances that $E_1$ and $E_2$ respectively lie from $P_1$. It is therefore assumed that measuring the potential between the electrodes $E_1$ and $E_2$ in the water is then equivalent to a measure made inside the earth at the same distances from the power electrode as $E_1$ and $E_2$ lie. The application of Ohm's law to the equipotential spheres leads to the following formula:

(1) $$\rho = \frac{4\pi}{i} E \frac{r_1 r_2}{r_2 - r_1}$$

wherein
$\rho$ = required resistivity
$E$ = difference of potential between electrodes $E_1$ and $E_2$
$r_1$ = distance of $E_2$ from power electrode $P_1$
$r_2$ = distance of $E_1$ from power electrode $P_1$ When the current flow is between an electrode $P_1$ within the drill hole and another electrode $P_3$ situated a considerable distance from the mouth of the drill hole, the generalized lines of current flow I are as shown in Figure 2. By placing the surface electrode a sufficient distance from the mouth of the well, the general path of current flow is substantially perpendicular to the axis of the bore hole. Under such conditions the current will flow substantially parallel to the bedding planes of the strata, and will concentrate within those strata having better conductivities. The effective path of current flow within the bore hole, for the condition illustrated in Figure 2, is not much greater than the radius of the bore hole itself.

When current is passed into the ground between the moving electrode $P_1$ and a fixed distant electrode $P_3$, with a constant potential power supply 8, the various major strata will manifest themselves by variations in the current flow. The thickness and electrical properties of these strata may therefore be determined by recording the variations of current flow versus depth, a recording system being included in the circuit for this purpose. Accurate measurement of the current variations is obtained by the following system; a sensitive recording milliammeter 7 is connected across a resistor 7'. This resistor is in series with the alternating current power supply 8, and current control resistor 44. An auxiliary potentiometer 42, energized by transformer 43, is employed to give a counter current to that created by the flow of current through resistor 7'. Since the E. M. F. from the potentiometer 42, (with transformer 43 connected across the constant potential power source 8) is constant, slight variations in current flow will be recorded. This system of exploration and the apparatus for conducting the same, are also described and specifically claimed in my application Serial No. 108,022, filed October 28, 1936.

Figure 2 also illustrates diagrammatically the general subsurface distribution of potential when one electrode is placed within the well, and the other electrode is placed at the surface of the ground a considerable distance from the mouth of the well, according to the present invention. The equipotential lines, although distorted more than in the ideal case illustrated in Figure 1, are distorted in a direction away from the drill hole, and in such manner as to better portray the characteristics of the strata. Furthermore, there is a concentration of current lines in the better conducting strata, and a decrease of current lines in the highly resistant strata. $S_3$ is shown as a better conducting strata.

The surface electrode $P_3$, of Figure 2, should preferably be placed at a distance from the mouth of the well, greater than one-third the depth to which the survey is to be carried. Due to the bending of the current lines, this spacing will allow the current, by the time it has reached the vicinity of the bore hole, to enter the borehole at a direction substantially along the bedding planes. The greater the distance between the fixed surface electrode and the moving well electrode, the more sensitive is the method. In some cases advantageous results have been obtained by connecting the electrode $P_3$ to the casing of a distant well.

Figure 3:
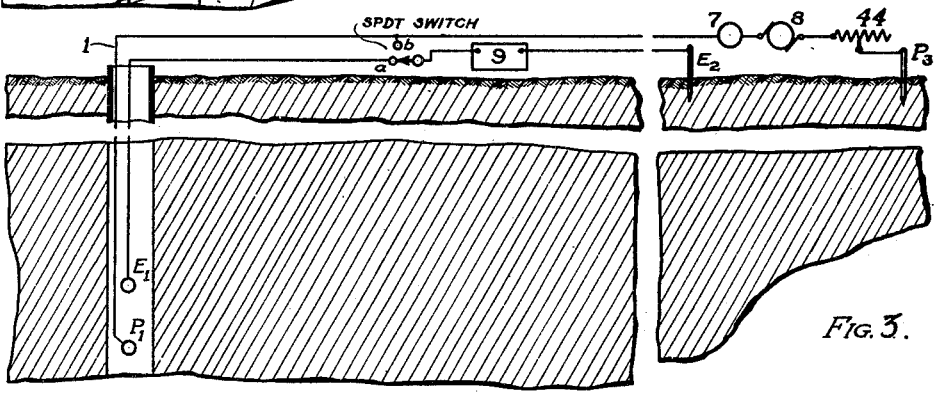
Figure 3 illustrates diagrammatically a system in accordance with this invention wherein one energizing electrode and one potential measuring electrode, having a fixed spacial relationship, are lowered into the drill hole. The other energizing electrode is located at the surface of the ground, a considerable distance from the top of the drill hole, in accordance with this invention.

Figure 3 illustrates a modification of the method, wherein the current flows between electrode $P_1$ within the well and $P_3$ at a distance on the surface. Potential measurements may now be made between electrode $E_2$ on the surface, and (a) an electrode $E_1$, having a fixed relationship with $P_1$, within the well, or (b) by connecting to conductor 1 and thereby utilizing electrode $P_1$ for both the current and potential circuits. In the latter case, a single wire insulated conductor may be suspended in the drill-hole.

It will be seen that the procedures described herein can be applied by using direct current, low or high frequency alternating current. Furthermore, the advantages of passing the current into the drill hole parallel to the bedding-planes, are of importance when measurements are made of the alternating current properties of the strata. These properties include impedance, dielectric values, phase shift, power loss, and the other phenomena and processes described in my Patent No. 2,038,046, issued April 21, 1936, on my co-pending application Serial No. 706,391, filed January 12, 1934.

According to this invention, therefore, as illustrated in the above-mentioned Figs. 2 and 3, the energizing current is passed through the earth between one current electrode within the hole and another current electrode connected to the earth at a position sufficiently removed from the drill hole to cause the current to flow through the strata adjacent the drill hole in a direction substantially along or parallel to the bedding planes, and measurements of an electrical variable are made between a point adjacent said one current electrode and another point spaced from the last-mentioned point. Both of the points between which measurements are taken are within the path of the current passed through the earth, so as to afford measurements which accurately reflect the effect of the current distribution upon the measured variable. As is apparent from the above description, the measurement point adjacent said one current electrode may be that electrode itself or a separate electrode adjacent thereto, while the other measurement point may be a separate electrode within the drill hole, or a separate electrode connected to the earth at a position adjacent the remote current electrode, or it may be the remote current electrode itself. It is also to be noted that the points or electrodes between which measurements are taken may coincide with the points or electrodes between which the current flow is created, or they may be in part or in whole separate therefrom.

Determining the general direction of dip is an important feature of this invention. Because of the anisotropic properties of the strata, and referring to Figure 4, it will be noted that measurements between an electrode $P_1'$ within the well, and another electrode $P_5$ located on the up-dip side of the drill hole, will have different electrical properties than measurements made between electrodes $P_1'$ and $P_4$ located on the down-dip side. Due to the curvature of the lines of current flow caused by the flow of current along the path of least resistance, the current from electrode $P_5$ will travel for a substantial distance along the bedding planes of the strata, while the current from $P_4$ will travel at a considerable angle to the bedding planes. The electrical characteristics of these two curves are quite different and their anomalies are easily recognized. By comparing the curves obtained from measurements between the well electrode and the electrodes placed with different orientations with the drill hole, the operator may determine the general direction of dip and strike of the strata. It will be understood that this method is a general qualitative method, rather than a quantitative method for accurately measuring the angle. It is sufficiently accurate however, to serve as a check for the general dip of strata, the straightness of the drill hole at any particular point, and for correlation of rock cores recovered during the drilling of the well. These directional measurements may be made by completing a series of subsequent runs wherein the well electrode $P_1'$ is connected first to $P_4$, then $P_5$, etc. The curves obtained from each of the runs are then compared. If desired however, a commutator arrangement can be employed which will rapidly shift from each of the surface electrodes. In this manner discontinuous graphs are obtained, using a recording oscillograph for recording the current and/or potentials, and by connecting the maximum peaks on each of the discontinuous points, it is possible to determine the characteristic curve for each pair of electrodes, as $P_1'$ and $P_4$, $P_1'$ and $P_5$, etc.

When determining the dip of the strata, it is usually advisable to employ three surface electrodes, spaced 120° apart, and equidistant from the mouth of the well. For more detailed work four surface electrodes may be employed, spaced 90° apart. Measurements are then made between each of these electrodes and the electrode in the well.

It is desirable to prevent actual contact of the moving electrode or electrodes within the well with the walls of the drill hole, or the well casing if the casing is in place. Such contacts cause irregular fluctuation in the recorded values, which increases the difficulty of interpretation. In order to overcome such variations, I have found that an insulated tube, extending over the electrode, is effective. The tube should preferably extend beyond the electrode for a distance greater than the radius of the drill hole, in order that the effective path of current flow will be substantially the same regardless of whether the insulated tube, with its internal electrode, is hanging in the center of the casing or adjacent one of the walls. This type of electrode is illustrated in Figure 5, and consists essentially of a Bakelite (or other insulating material) tube 4, suspended from the cable by means of a clamp 5, and an electrode $P_1$ within the space enclosed by the insulating tube 4. One end of the insulating tube is closed. When one or both of the potential electrodes are placed within the hole, it is often desirable that all electrodes within the well be provided with the insulating sleeve, in order to prevent direct contact wtih the strata, or well casing.

Use of this type of electrode also gives better differentiation of the different strata. This may be explained as follows: To minimize contact resistance it is necessary that the current electrode possess considerable length. Ordinarily this produces a broad distribution of current which masks the effects of thin strata. When an insulating tube is placed over the electrode, (with space between the electrode and the insulating tube) the contact resistance is not increased, and the current flows from the opening in the insulating tube to the strata, in a concentrated radial zone, as illustrated in Figure 5, by lines I. This type of electrode is therefore particularly advantageous when used in conjunction with the distant surface electrode. It may, however, be employed with other systems.

Various types of apparatus may be used in conjunction with the system described in this patent, when measurements are made in uncased bore holes. The following apparatus was developed for accurate delineation of those strata having electrical characteristics which differ only slightly. While the following apparatus is particularly suitable for the bore hole investigations described in this patent where distant electrodes are employed, it is not limited solely to such uses, but may advantageously be employed in conjunction with many of the methods now in use for bore hole surveying.

Referring to Figure 6, a two-wire cable containing insulated conductors 10 and 11, is employed for connecting the instrument and electrodes placed within the drill hole, with the measuring apparatus at the surface of the ground. The cable passes over a measuring sheave 14, which is suspended from the derrick by means of any convenient line, 15. A hook 16, with a weight scale on its shank, mounted upon a resilient spring support 17 serves as a weight indicator. A similar hook 16', connected by a cable 15', is fastened to the legs of the derrick, in order to so position the sheave that the cable will freely enter the drill hole. The cable is wound upon a hoisting drum 18, and is raised or lowered by power supplied by the engine of the truck 19. The hoist drum is provided with two slip-rings 39 and 40, with brushes, and connected by insulated leads 10' and 11' to the recording and control apparatus in the truck. The two wires 10 and 11 of the cable are each connected to one of the slip-rings. Fastened to the sheave wheel 14 is a sprocket wheel 20 geared to a self-synchronizing motor 21. The self-synchronizing motor is electrically connected with a similar synchronizing motor which drives the recording chart. The use of a pair of synchronizing motors for remote coupling is well known to the art, and need not be described in detail here. Within the bore hole is placed a "bomb" or water-tight case 41, provided with an insulating sleeve 47, as previously described. The case is of metal and serves as one of the electrodes. Two additional electrodes $E_1$ and $E_2$ are provided, and spaced approximately 5 and 15 feet from the bomb. These electrodes are provided with insulating sleeves 26 and 26'.

A general wiring diagram for the equipment within the bomb, and the surface equipment, is given in Figure 7, and referring thereto: The water-tight case 41 contains a three-electrode vacuum tube or triode 22, a bias "C" battery 23, a high impedance transformer 24 having maximum frequency response for the frequency of the alternating current employed in this work, and blocking condensers 25 and 25'. One side of the filament of the vacuum tube is connected to insulated conductor 10 of the cable, and the other side of the filament is connected to a suitable electrode, which may be the case of the bomb 41. The grid circuit of the vacuum tube is connected to the secondary S of the transformer 24, and proper "C" bias battery 23 is employed to operate on the lower part of the grid plate-current characteristic. The primary of the transformer is connected to two potential electrodes 26 and 26'. The blocking condensers 25 and 25' are inserted in the circuit to prevent the flow of earth currents and other direct currents into the transformer. The plate of the vacuum tube is connected to conductor 11 of the cable, which extends to the surface of the ground.

For energizing the earth, and also for supplying current for the filament of the vacuum tube a 500/5000 cycle alternator 27, driven by a two-speed motor 28 (or other motive power) is employed. A suitable battery 45 and speed control rheostat 46 are provided for the motor. The alternator 27 is connected to a transformer 29, having variable voltage output in order to maintain proper current flow in the energizing circuit. A rheostat 38 is inserted in the energizing circuit to accurately control the current. This current usually is maintained at the proper value for the filament of the vacuum tube. An ammeter 30 is used for proper adjustment of the energizing current. The plate circuit of the triode tube contains a milliammeter 31, a resistor 32, plate battery 33 and switch 48. Across the resistor 32 is connected the continuous photographic recording galvanometer 34, and a neutralizing potentiometer 35, with its battery 37. The sensitive paper of the continuously recording galvanometer 34 is driven, through suitable gears, by the second self-synchronizing motor coupled to the self-synchronizing motor 21.

Actual operation of the complete apparatus for alternating current impedance measurements involves the following steps:

An insulated conductor 12 is laid along the surface of the ground and the outer end connected to an electrode 13; the electrode 13 being located at a distance greater than one-third and preferably equal to, the maximum depth to which the survey is to extend in the well. After proper mechanical set-up of the sheave wheel, and alignment of the truck, the cable (on the end of which is fastened the water-tight instrument bomb and auxiliary electrodes) is passed over the sheave wheel and lowered a short distance into the well. The bomb is lowered a distance sufficient to allow it, together with the auxiliary potential electrodes $E_1$ and $E_2$ to be completely immersed in the fluid of the drill hole. Alternator 27 is started, and operated at one frequency during the run. By means of switch 36 and resistor 38 the current flowing in the energizing circuit is adjusted to its proper value. Switch 48 is now closed, resulting in flow of current in the plate circuit of the vacuum tube. Potentiometer 35 is adjusted to give a predetermined reading on the galvanometer 34. The function of the potentiometer 35 is to supply a potential which will be approximately equal to and of opposite polarity or phase to the potential drop across the resistor 32. Measurements may therefore be made of the change of plate current, rather than the total current, with a resultant increase in sensitivity of the recording apparatus, for small changes in plate current. The recording mechanism on the galvanometer 34 is next placed in operation. The hoist drum 18 is now started to revolve slowly, and a continuous record of variations in plate current made as the bomb descends the drill hole. Throughout this recording, the current in the energizing circuit, i. e., the current between electrodes $P_1$ and 13 is preferably maintained constant so that the readings taken in the measuring circuit are directly comparable. However, within the limits of satisfactory operation of the vacuum tube 22 whose filament is included in the energizing circuit, the energizing current may be allowed to vary somewhat, and the value thereof may be continuously recorded, using a recording-type ammeter at 30. If desired a similar record may be made on the ascent, preferably using a different frequency for the energizing circuit. I have found that frequencies of 500 and 5000 cycles give data which are of decided value for proper delineation of subsurface values. The records obtained during the ascent and/or descent may now be compared by means of a light box and deductions made regarding the subsurface strata. Calculations may be made, and graphs plotted, giving alternating current impedance and dielectric value of the strata. If desired, simultaneous recording of plate current and earth energizing current may be made (whereupon recording galvanometer 34 would be of the high frequency oscillograph type employing two light tracks), for studies of phase shift, wave-form and similar alternating current phenomena. Methods of carrying out these measurements and the computations thereto are given in recognized text books of physics and electrical engineering, and in my previously mentioned co-pending patent application.

Figure 4:
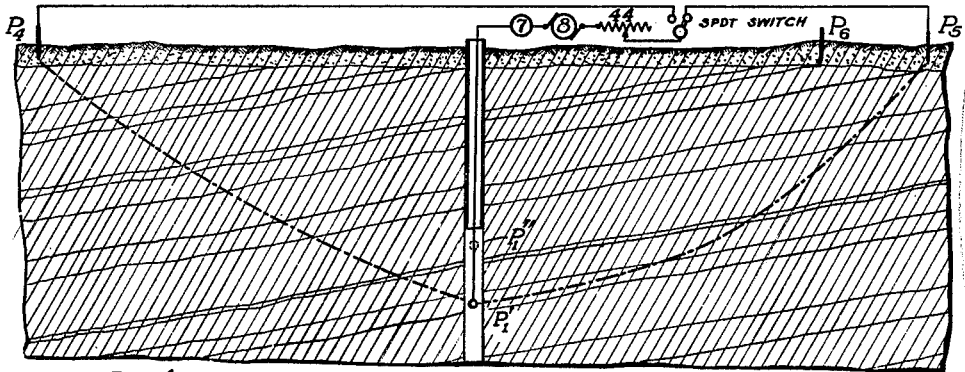
Figure 4 illustrates diagrammatically a method of making measurements in two or more directions from the mouth of a bore hole, in order to determine the general dip and strike of strata, together wtih important geological features in the subsurface.

In areas where the dip of the strata is small, it is usually advisable to simultaneously move the surface electrode and the well electrode. The surface electrode is usually moved in increments of distance, outward from the mouth of the well, two to three times as great as the increments of descent of the well electrode. When surveying a well to a depth of 1000 feet, the surface electrode will have been moved outward from the mouth of the well, in the desired direction of measurement, a distance of 2000 to 3000 feet. In work of this type the surface and the well electrodes are moved in small increments, usually five feet in the hole and ten or fifteen feet along the surface. This procedure is illustrated in Figure 4 hereof; the well electrode is placed at position $P_1'$ when measurements are made to the surface electrode $P_5$. The electrode in the well is next moved to $P_1''$ and measurements made to the surface electrode located at $P_6$, etc.; and this procedure is repeated until the entire depth of the well has been traversed.

Measurements of this type are somewhat similar to those described in my pending application, Serial No. 12,640, filed March 23, 1935, "Method and apparatus for determining underground structure." Analysis of the curves to determine the dip of strata is also similar to the interpretation of the curves obtained in this last mentioned application.

Having described my invention, I claim:

1. A method for determining the character and thickness of the strata in a geological formation traversed by an uncased drill hole, which comprises: passing an electric current through the strata adjacent the drill hole in a direction along and substantially parallel to the bedding planes of the strata, while determining the relative values of said current and of the accompanying electrical potential between two spaced points within the path of such current flow, at least one of which points is within the drill hole adjacent said strata; and repeating the steps of passing such current and determining said relative values, with the current flowing through strata at different depths.

2. A method for determining the character and thickness of the strata in a geological formation traversed by an uncased drill hole, which comprises: passing an electric current between two electrodes and through the formation adjacent the drill-hole in a direction substantially along and parallel to the bedding planes of the strata; moving one of said electrodes along the drill hole, and determining variations in electrical properties of the strata adjacent the moving electrode, as said electrode is moved to different depths, by measuring the resulting changes in the electrical potential between a point adjacent said moving electrode and another point spaced from said first-named point and within the path of said current.

3. A method for determining the character and thickness of the strata in a geological formation traversed by an uncased drill hole, which comprises: passing an electric current between two electrodes and through the formation adjacent the drill hole in a direction substantially along and parallel to the bedding planes of the strata; moving one of said electrodes along the drill hole; and determining variations in the electrical properties of the strata adjacent the moving electrode, as said electrode is moved to different depths, by measuring the resulting changes in the electrical potential between a point adjacent said moving electrode and another point spaced from said first-named point and within the path of said current, while maintaining a constant flow of current between said electrodes.

4. A method for determining the character and thickness of the strata in a geological formation traversed by an uncased drill hole, which comprises: passing an electric current between two electrodes and through the formation adjacent the drill hole in a direction substantially along and parallel to the bedding planes of the strata; moving one of said electrodes along the drill hole; and determining variations in electrical resistance of the strata adjacent the moving electrode, as said electrode is moved to different depths, by measuring the resulting changes in the electrical potential between a point adjacent said moving electrode and another point spaced from said first-named point and within the path of said current.

5. A method for determining the character and thickness of the strata in a geological formation traversed by an uncased drill hole, which comprises: passing an alternating current between two electrodes and through the formation adjacent the drill hole in a direction substantially along and parallel to the bedding planes of the strata; moving one of said electrodes along the drill hole; and measuring the changes in dielectric value of the strata adjacent the moving electrode as said moving electrode is moved to different depths, said measurements being made between a point adjacent the moving electrode and another point spaced therefrom and within the path of said current.

6. A method for determining the character and thickness of the strata in a geological formation traversed by an uncased drill hole, which comprises: passing an alternating electric current between two electrodes and through the formation adjacent the drill hole in a direction substantially along and parallel to the bedding planes of the strata; moving one of said electrodes along the drill hole; and continuously measuring the changes in dielectric value of the strata adjacent the moving electrode.

7. A method for determining the character and thickness of the strata in a geological formation traversed by an uncased drill hole, which comprises: passing an alternating electric current between two electrodes and through the formation adjacent the drill hole in a direction substantially along and parallel to the bedding planes of the strata; moving one of said electrodes along the drill hole; and measuring the changes in alternating current impedance of the strata adjacent the moving electrode as said moving electrode is moved to different depths, said measurement being made between a point adjacent the moving electrode and another point spaced therefrom and within the path of said current.

8. A method for determining the character and thickness of the strata in a geological formation traversed by an uncased drill hole, which comprises: passing an alternating electric current between two electrodes and through the formation adjacent the drill hole in a direction substantially along and parallel to the bedding planes of the strata; moving one of said electrodes along the drill hole; and continuously measuring the changes in alternating current impedance of strata adjacent the moving electrode.

9. A method for determining the character and thickness of the strata in a geologic formation traversed by an uncased drill hole, which comprises: passing an electric current between two electrodes and through the formation adjacent the drill hole in a direction substantially along and parallel to the bedding planes of the strata; moving one of said electrodes along the drill hole, and determining variations in electrical properties of the strata adjacent the moving electrode, as said electrode is moved to different depths, by taking measurements between a point adjacent said moving electrode and another point spaced from the first-named point and within the path of said current, of an electrical variable indicative of such variations in electrical properties.

10. A method for determining the character and thickness of the strata in a geological formation traversed by an uncased drill hole, which comprises: passing an electric current through the formation adjacent the drill hole in a direction substantially along and parallel to the bedding planes of the strata, through an energizing circuit including an electrode within the drill hole; moving said electrode along the drill hole; and continuously measuring the changes in electrical properties of the strata adjacent said electrode by taking measurements, in a separate measuring circuit including an electrode within the drill hole, of an electrical variable indicative of changes in said electrical properties.

11. A method for determining the character and thickness of the strata in a geological formation traversed by an uncased drill hole, which comprises: passing an electric current between two electrodes and through the formation adjacent the drill hole in a direction substantially along and parallel to the bedding planes of the strata; moving one of said electrodes along the drill hole; and determining variations in electrical properties of the strata adjacent the moving electrode, as said electrode is moved to different depths, by measuring the resulting changes in the electrical potential between two points spaced from one another within the drill hole adjacent said moving electrode.

12. A method for determining the character and thickness of the strata in a geological formation traversed by an uncased drill hole, which comprises: moving along the drill hole an electrode system; passing an electric current from one electrode of said system, through the formation adjacent the drill hole, in a direction substantially along and parallel to the bedding planes of the strata; and continuously measuring the changes in potential between two electrodes of said system.

13. A method for determining the character and thickness of the strata in a geological formation traversed by an uncased drill hole, which comprises: moving along the drill hole an electrode system; passing an electric current from one electrode of said system through the formation adjacent the drill hole in a direction substantially along and parallel to the bedding planes of the strata, and continuously measuring the changes in potential between two electrodes of said system while maintaining a constant flow of current.

14. A method for determining the character and thickness of the strata in a geological formation traversed by an uncased drill hole, which comprises: moving along the drill hole an electrode system; passing an alternating electric current from one electrode of said system through the formation adjacent the drill hole in a direction substantially along and parallel to the bedding planes of the strata; and continuously measuring the changes in phase-angle between the current and the potential across two electrodes of said system.

15. Apparatus for determining the character and thickness of the strata in a geological formation traversed by an uncased drill hole, comprising an electrode, an insulated cable for lowering said electrode to different depths within a drill hole and into electrical connection with the fluid in a drill hole; a second electrode connected to the earth at a fixed point removed from the drill hole a distance at least one-third the depth of the first-named electrode within the drill hole, an electric circuit connected to said electrodes, a source of electric current included in said circuit for passing electric current through the earth between said electrodes, and means for measuring the electrical properties of the earth adjacent the position of the first-named electrode, said measuring means comprising an electric circuit including a measuring device and connected to two spaced electrodes which are disposed within the path of current passed through the earth between the two first-mentioned electrodes and at least one of which is disposed within said drill hole.

16. Apparatus for determining the character and thickness of the strata in a geological formation traversed by an uncased drill hole, comprising an electrode, an insulated cable for lowering said electrode to different depths within a drill hole and into electrical connection with the fluid in the drill hole, a second electrode connected to the earth at a fixed point removed from the drill hole a distance at least one-third the depth of the first-named electrode within the drill hole, an electric circuit connected to said electrodes, means for maintaining a constant flow of current in said circuit and through the earth between said electrodes, a separate circuit including two spaced electrodes at least one of which is positioned within the drill hole, and means included in said separate circuit for continuously measuring the variations in potential between the last-named electrodes as the first-named electrode traverses the drill hole.

17. Apparatus for determining the character and thickness of the strata in a geological formation traversed by an uncased drill hole, comprising an electrode, an insulated cable for lowering said electrode to different depths within a drill hole and into electrical connection with the fluid in the drill hole, a second electrode connected to the earth at a point removed from the drill hole a distance at least one-third the depth of the first-named electrode within the drill hole, an electric circuit connected to said electrodes, means for maintaining a measured flow of current in said circuit and through the earth between said electrodes, a separate circuit including two spaced electrodes both positioned within the drill hole adjacent the first-mentioned electrode, and means included in said separate circuit for measuring the variations in potential between the last-named electrodes as the first-named electrode traverses the drill hole.

18. A method for determining the direction of dip of the strata of a geological formation traversed by an uncased drill hole, which comprises: passing an electrical current through the earth in a direction substantially parallel to the bedding planes of the strata, between one electrode within the drill hole and another electrode at the earth's surface and removed from said drill hole; measuring differences in the electrical properties of the earth adjacent said drill hole, with said other electrode disposed in each of at least two directions from said drill hole and with said one electrode at different depths, comparing the depth-electrical curves so obtained for the respective directions of said other electrode, and determining the direction of dip by analysis of the anisotropic properties of the strata as indicated by said curves.

19. A method for determining the direction of dip of the strata of a geological formation traversed by an uncased drill hole, which comprises: moving along the drill hole an electrode, passing an electric current through the earth between the moving electrode and a fixed electrode on the surface, continuously measuring the electrical properties of the strata adjacent the drill hole through which said current passes, as the first electrode is moved, repeating said operations with the fixed electrode at each of a plurality of positions having different orientations with respect to the bore hole, and determining the dip of the strata by analysis of the anistropic properties of the strata as indicated by said measurements.

20. An electrode assembly for use in determining the character and thickness of the strata in a geological formation traversed by an uncased drill hole, embodying: an electrode; and an elongated insulating sleeve extending over said electrode and spaced therefrom; said insulating sleeve extending beyond the ends of the electrode for a distance greater than half the diameter of the drill hole.

21. An electrode assembly for use in determining the character and thickness of the strata in a geological formation traversed by an uncased drill hole, embodying: an electrode; and an elongated insulating sleeve closed at one end and extending over said electrode and spaced therefrom; said insulating sleeve having an open end extending beyond the end of the electrode for a distance greater than half the diameter of the drill hole.

22. Apparatus for determining the character and thickness of the strata in a geological formation traversed by an uncased drill hole, comprising: a cable; an electrode assembly supported by said cable, positioned within a drill hole and including an energizing electrode and two auxiliary electrodes spaced from one another and from said energizing electrode; means operatively associated with said cable for raising and lowering said electrode assembly within the drill hole; another energizing electrode connected to the earth at a position removed from the drill hole a distance at least one-third the maximum depth of said electrode assembly within the drill hole; an electric circuit connected to said energizing electrodes and including means for passing an electric current through the earth between said energizing electrodes; and electric circuit means connected to said auxiliary electrodes and including means for continuously measuring changes in the potential between said auxiliary electrodes.

23. Apparatus as set forth in claim 22, said last-named electric circuit means comprising a triode whose filament is associated with the first-named electric circuit for energization by flow of electric current therein, a continuous measuring device, grid circuit means connecting said auxiliary electrodes to the grid of said triode, and plate circuit means connecting the plate of said triode to said continuous measuring device.

24. In apparatus for determining the character and thickness of the strata in a geological formation traversed by an uncased drill hole, the combination which comprises: a cable; an electrode assembly supported by said cable, positioned within a drill hole and including an energizing electrode and two auxiliary electrodes spaced from one another and from said energizing electrode and a triode; an electrical conductor extending within said cable and connected to said energizing electrode; said triode having its filament associated with said conductor for energization by flow of electric current therein; grid circuit means connecting said auxiliary electrodes to the grid and filament of said triode; plate circuit means comprising conductor means extending within the cable and connected to the plate and filament of said triode; and a measuring device connected to said plate circuit.

25. The method for determining the direction of dip of the strata of a geologic formation traversed by an uncased drill hole, which comprises: passing an electric current and determining the electrical properties of the earth included between an electrode within the drill hole and a second electrode at the surface of the ground; progressively moving said surface electrode and lowering said well electrode at a known ratio and repeating said passage of current for successive depths of the well electrode and successive distances for the surface electrode, determining the electrical properties of the strata through which said current passes as the electrodes are moved; repeating said operations with the surface electrode at each of a plurality of positions having different orientations with respect to the bore hole, and determining the dip of the strata by analysis of the anisotropic properties of the strata as indicated by said measurements.

JOHN JAY JAKOSKY.